(12) United States Patent
Sakamoto

(10) Patent No.: US 8,857,557 B2
(45) Date of Patent: Oct. 14, 2014

(54) WORK VEHICLE

(71) Applicant: Komatsu Ltd., Tokyo (JP)

(72) Inventor: Akihiko Sakamoto, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/114,248

(22) PCT Filed: Mar. 13, 2013

(86) PCT No.: PCT/JP2013/057043
§ 371 (c)(1),
(2), (4) Date: Oct. 28, 2013

(65) Prior Publication Data
US 2014/0262589 A1 Sep. 18, 2014

(51) Int. Cl.
*B60K 13/04* (2006.01)
(52) U.S. Cl.
CPC ..................... *B60K 13/04* (2013.01)
USPC .......................... 180/309; 180/296; 180/89.2
(58) Field of Classification Search
USPC ................. 180/291, 296, 89.2, 309
See application file for complete search history.

(56) References Cited

U.S. PATENT DOCUMENTS

| 3,656,642 | A | * | 4/1972 | Kostas et al. ................. 414/697 |
| 4,171,028 | A | * | 10/1979 | van der Lely ................. 180/235 |
| 4,955,455 | A | * | 9/1990 | Albright et al. ............... 180/291 |
| 6,170,596 | B1 | * | 1/2001 | Triarsi et al. .................. 180/291 |
| 6,427,798 | B1 | * | 8/2002 | Imashige ....................... 180/309 |
| 6,655,486 | B2 | * | 12/2003 | Oshikawa et al. ............ 180/68.1 |
| 6,910,544 | B2 | * | 6/2005 | Sewell .......................... 180/68.4 |
| 7,523,804 | B2 | * | 4/2009 | Tanaka et al. ................. 180/291 |
| 7,558,658 | B2 | * | 7/2009 | Kuramoto et al. ............. 701/50 |
| 7,717,205 | B2 | * | 5/2010 | Kertz et al. ................... 180/68.3 |
| 8,141,535 | B2 | * | 3/2012 | Olsen et al. ................. 123/198 E |
| 8,167,067 | B2 | * | 5/2012 | Peterson et al. ............. 180/68.2 |
| 8,191,668 | B2 | * | 6/2012 | Keane et al. .................. 180/296 |
| 8,215,434 | B2 | * | 7/2012 | Matsushita et al. .......... 180/68.4 |
| 8,381,865 | B2 | * | 2/2013 | Okada .......................... 180/309 |
| 8,651,218 | B2 | * | 2/2014 | Okada .......................... 180/296 |
| 8,672,082 | B2 | * | 3/2014 | Kashu et al. ................. 180/309 |
| 8,720,638 | B1 | * | 5/2014 | Nakagami et al. ............ 180/309 |

(Continued)

FOREIGN PATENT DOCUMENTS

JP 2009-108685 A 5/2009
JP 2013-11109 A 1/2013

OTHER PUBLICATIONS

International Search Report for PCT/JP2013/057043, issued on Jun. 11, 2013.

*Primary Examiner* — Jeffrey J Restifo
*Assistant Examiner* — Erez Gurari
(74) *Attorney, Agent, or Firm* — Global IP Counselors, LLP

(57) ABSTRACT

A partition wall is arranged between an engine and a radiator in an engine room. A first exhaust processing unit has a first exhaust processing apparatus and a first mount section. The first exhaust processing apparatus is arranged between the engine and the partition wall. A second exhaust processing unit has a second exhaust processing apparatus and a second mount section. The second exhaust processing apparatus is arranged above the first exhaust processing apparatus. The second exhaust processing apparatus is arranged so as to overlap with at least a portion of the first exhaust processing apparatus in a planar view. The partition wall has a first wall member and a second wall member arranged above the first wall member. The distance between the boundary between the first and second wall members and the second exhaust processing unit is larger than the outer diameter of the first exhaust processing apparatus.

13 Claims, 7 Drawing Sheets

(56) References Cited

U.S. PATENT DOCUMENTS

2003/0066209 A1* 4/2003 Takezaki et al. ............... 37/197
2010/0186394 A1* 7/2010 Harrison et al. ............... 60/299
2010/0275588 A1* 11/2010 Kamata et al. ................. 60/322
2011/0120085 A1* 5/2011 Saito et al. ..................... 60/272
2012/0247861 A1* 10/2012 Mizuno et al. ................ 180/296
2014/0020972 A1* 1/2014 Masumoto et al. ........... 180/309

* cited by examiner ations. It is
WORK VEHICLE

CROSS-REFERENCE TO RELATED APPLICATIONS

This application is a U.S. National stage application of International Application No. PCT/JP2013/057043, filed on Mar. 13, 2013.

BACKGROUND

1. Field of Invention

The present invention relates to a work vehicle.

2. Background Information

In recent years, an exhaust processing apparatus for processing exhaust has been mounted onto a work vehicle. It is desirable for a plurality of exhaust processing apparatuses to be mounted in order to improve capabilities for processing exhaust. For example, a diesel particulate filter apparatus and a selective catalytic reduction apparatus are provided in a work vehicle which is disclosed in US Patent No. 2010/0186394. The diesel particulate filter apparatus reduces particulate matter in the exhaust. The selective catalytic reduction apparatus reduces the nitrogen oxide (NOx) in the exhaust.

An engine and a radiator are arranged in an engine room in the work vehicle. A partition wall for suppressing the effects of heat from the engine on the radiator to be low is provided between the radiator and the engine. The partition wall segments the inside of the engine room into a first accommodating space where the engine is arranged and a second accommodating space where the radiator is arranged.

It is preferable that the exhaust processing apparatus described above be arranged in the first accommodating space along with the engine in order to be connected to the engine through a connecting pipe, and it is preferable that the exhaust processing apparatus be directly mounted on an engine mount in a configuration where the connecting pipe is short. This is because twisting is generated in a vehicle body frame due to the work vehicle performing excavation work and an excessive load is applied to the connecting pipe which links the exhaust processing apparatus and the engine. In addition, in a case where a plurality of the exhaust processing apparatuses are mounted on the engine mount, it is preferable that the plurality of exhaust processing apparatuses be arranged to be aligned up and down between the engine and the partition wall. Due to this, it is possible to arrange the exhaust processing apparatuses, the engine, and the partition wall in a compact manner in the first accommodating space.

However, when the plurality of exhaust processing apparatuses are arranged to be aligned up and down, it is difficult for the exhaust processing apparatus which is positioned at the bottom to be moved upward in order to be removed from the vehicle. In particular, it is preferable that the exhaust processing apparatuses and the partition wall be arranged to be close in order for the exhaust processing apparatuses, the engine, and the partition wall to be arranged in a compact manner. In this case, the exhaust processing apparatus which is positioned on top is an impediment to removing the exhaust processing apparatus which is positioned at the bottom. As a result, maintenance on the exhaust processing apparatuses is difficult.

An object of the present invention is to provide a work vehicle where it is possible to easy carry out maintenance on exhaust processing apparatuses while devices inside an engine room are arranged in a compact manner.

A work vehicle according to a first aspect is provided with an engine room, an engine, a radiator, a partition wall, a first exhaust processing unit, and a second exhaust processing unit. The engine is arranged in the engine room. The radiator is arranged in the engine room. The partition wall is arranged between the engine and the radiator in the engine room. The partition wall segments a first accommodating space and a second accommodating space in the engine room. The engine is arranged in the first accommodating space. The radiator is arranged in the second accommodating space. The first exhaust processing unit has a first exhaust processing apparatus and a first mount section. The first exhaust processing apparatus is arranged between the engine and the partition wall. The first mount section supports the first exhaust processing apparatus. The second exhaust processing unit has a second exhaust processing apparatus and a second mount section. The second exhaust processing apparatus is arranged above the first exhaust processing apparatus. The second mount section supports the second exhaust processing apparatus. The second exhaust processing apparatus is arranged to overlap with at least a portion of the first exhaust processing apparatus in a planar view of the vehicle. The partition wall has a first wall member and a second wall member which is separate from the first wall member. The second wall member is arranged above the first wall member. The distance between the boundary, between the first wall member and the second wall member, and the second exhaust processing unit is larger than the outer diameter of the first exhaust processing apparatus.

It is possible to easily remove the first exhaust processing apparatus from the vehicle by removing the second wall member even when the partition wall is arranged to be close to the first exhaust processing apparatus and the second exhaust processing apparatus. Due to this, it is possible to easily carry out maintenance on the first exhaust processing apparatus while the devices inside the engine room are arranged in a compact manner.

Preferably, the distance between the boundary and the second mount section is larger than the outer diameter of the first exhaust processing apparatus. In this case, it is possible to easily remove the first exhaust processing apparatus from the vehicle by passing the first exhaust processing apparatus between the first wall member and the second mount section due to the second wall member having been removed.

Preferably, the distance between the boundary and the second exhaust processing apparatus is larger than the outer diameter of the first exhaust processing apparatus. In this case, it is possible to easily remove the first exhaust processing apparatus from the vehicle by passing the first exhaust processing apparatus between the first wall member and the second exhaust processing apparatus due to the second wall member having been removed.

Preferably, the boundary between the first wall member and the second wall member is positioned to be the same height as or to be lower than the top portion of the first exhaust processing apparatus. In this case, it is possible to secure a large space for removing the first exhaust processing apparatus due to the second wall member having been removed.

Preferably, the boundary is positioned to be the same height as or to be higher than the bottom portion of the first exhaust processing apparatus. In this case, it is possible to reduce the size of the second wall member compared to a case where the boundary is arranged below the bottom portion of the first exhaust processing apparatus. Due to this, it is possible to easily remove the second wall member from the vehicle.

Preferably, the boundary is positioned between the center and the bottom portion of the first exhaust processing apparatus in the vehicle up and down direction. In this case, it is possible to secure a larger space for moving the first exhaust processing apparatus.

Preferably, a gap between the second exhaust processing apparatus and the partition wall is smaller than the outer shape of the first exhaust processing apparatus. In this case, it is possible to arrange the second exhaust processing apparatus and the partition wall in a compact manner.

Preferably, the work vehicle is further provided with a connecting pipe. The connecting pipe connects the first exhaust processing apparatus and the second exhaust processing apparatus. The connecting pipe is arranged between the second exhaust processing apparatus and the partition wall and arranged above the first exhaust processing apparatus. In this case, it is possible to easily remove the connecting pipe.

Preferably, the work vehicle is further provided with a connecting pipe. The connecting pipe connects the first exhaust processing apparatus and the second exhaust processing apparatus. The connecting pipe is arranged between the first exhaust processing apparatus and the engine and arranged below the second exhaust processing apparatus. In this case, it is possible to suppress the connecting pipe becoming an obstacle when removing the first exhaust processing apparatus from the vehicle.

Preferably, the work vehicle is further provided with a reducing agent hose and a cover member. The reducing agent hose is a hose for supplying reducing agent to the second exhaust processing apparatus. The cover member covers the reducing agent hose. The cover member is attached to the second wall member. In this case, it is possible for the cover member to be removed along with the second wall member without removing the cover member from the second wall member when removing the second wall member. Due to this, it is possible to reduce the effort required to remove the cover member from the second wall member when removing the second wall member.

Preferably, the work vehicle is further provided with a vehicle body frame. The vehicle body frame supports the radiator. The second wall member is supported by the radiator. In this case, it is possible for the second wall member to be supported by the vehicle body frame using a simple configuration since the radiator is supported by the vehicle body frame.

Preferably, the first exhaust processing apparatus is a diesel particulate filter apparatus. In this case, it is possible for particulate matter in the exhaust to be reduced in the first exhaust processing apparatus.

Preferably, the second exhaust processing apparatus is a selective catalytic reduction apparatus. In this case, it is possible for nitrogen oxide in the exhaust to be reduced in the second exhaust processing apparatus.

In the work vehicle of the present invention, it is possible to easy carry out maintenance on the exhaust processing apparatuses while the devices inside an engine room are arranged in a compact manner.

DETAILED DESCRIPTION OF THE EMBODIMENTS

Figure 1:
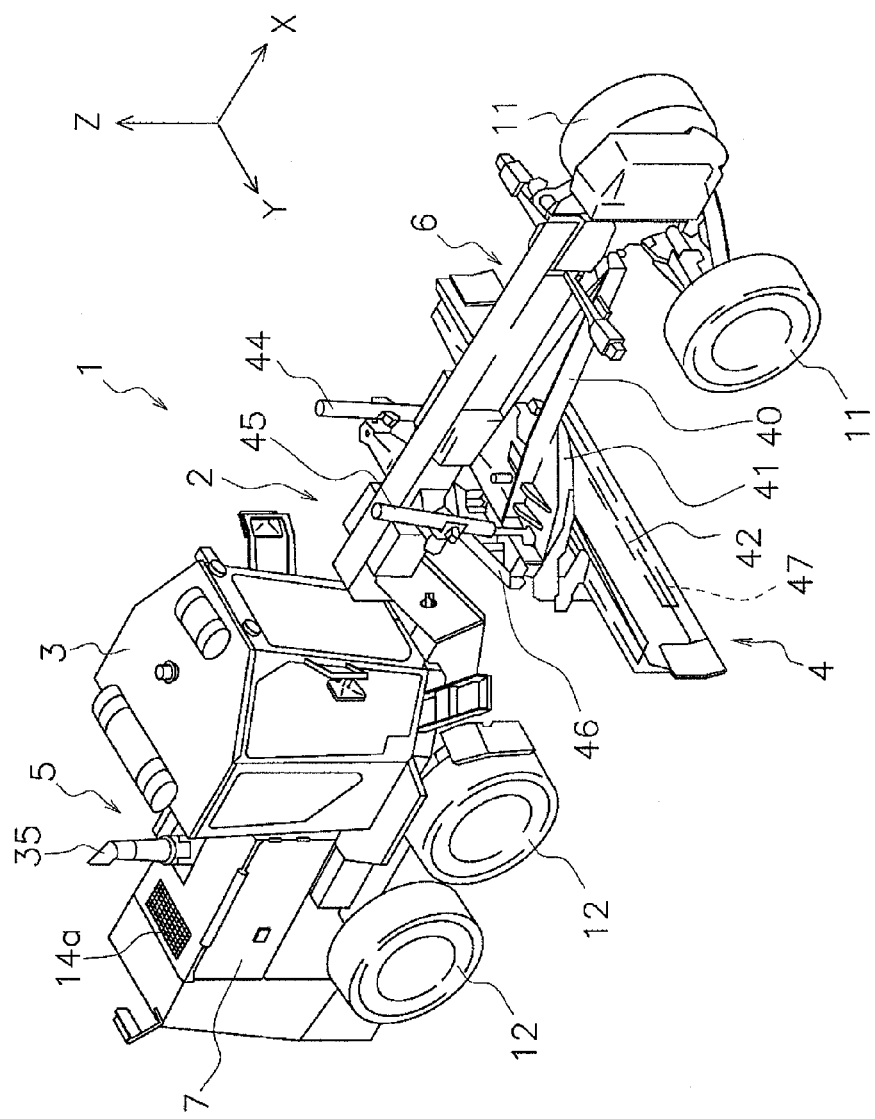
FIG. 1 is a perspective view of the external appearance of a work vehicle.
Figure 2:
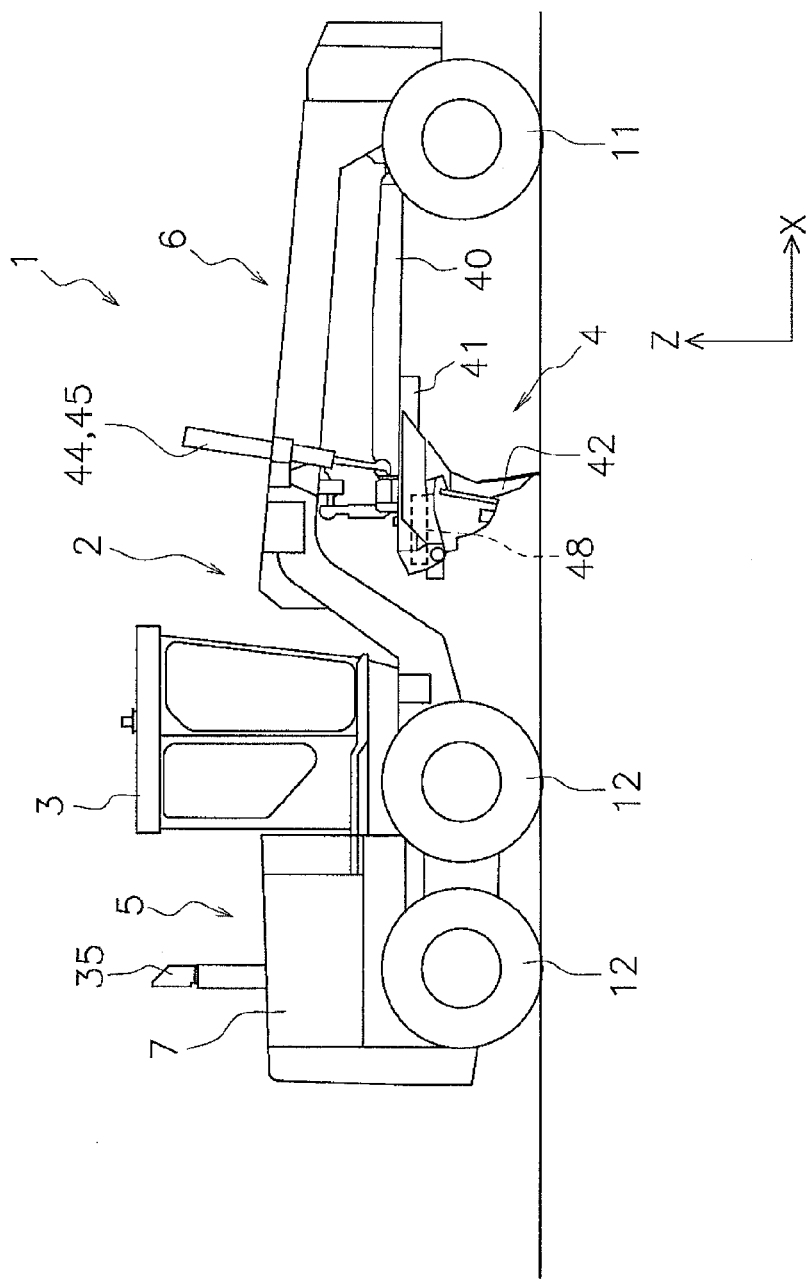
FIG. 2 is a side view of the work vehicle.

Below, a work vehicle 1 according to an embodiment will be described with reference to the drawings. FIG. 1 is a perspective view of the external appearance of the work vehicle 1. FIG. 2 is a side view of the work vehicle 1. The work vehicle 1 is a so-called motor grader. The work vehicle 1 is provided with a plurality of driving wheels which include front wheels 11 and rear wheels 12. It is possible for the work vehicle 1 to perform ground leveling work, snow removal work, light cutting, material mixing, and the like using a blade 42 which is provided between the front wheels 11 and the rear wheels 12. As shown in FIG. 1 and FIG. 2, the work vehicle 1 is provided with a vehicle body 2, a cab 3, and a working machine 4.

The vehicle body 2 includes a rear section vehicle body 5 and a front section vehicle body 6. The rear section vehicle body 5 has the rear wheels 12 described above. The work vehicle 1 moves due to the rotational driving of the rear wheels 12 according to the driving force from the engine which will be described later. In addition, the rear section vehicle body 5 has an engine room 7 which accommodates the engine. The configuration of an inner section of the engine room 7 will be described later.

The front section vehicle body 6 is arranged in front of the rear section vehicle body 5. The front section vehicle body 6 has the front wheels 11 described above. The front wheels 11 are arranged in the front section of the front section vehicle body 6.

The cab 3 is mounted to the rear section vehicle body 5. Operating sections (which is not shown in the view) such as a handle, a gear change lever, and an operating lever of the working machine 4 are provided in an inner section of the cab 3. Here, in the present embodiment, front, back, left, and right have the meaning of front, back, left, and right as viewed by the driver inside the cab 3. In addition, in the views, the front and back direction is shown as the X axis, the left and right direction is shown as the Y axis, and the up and down direction is shown as the Z axis.

The working machine 4 has a drawbar 40, a circle 41, the blade 42, a hydraulic motor (which is not shown in the views), various types of hydraulic cylinders 44 to 48, and the like. The various types of hydraulic cylinders 44 to 48 include lift cylinders 44 and 45, a drawbar shift cylinder 46, a blade shift cylinder 47, and a tilt cylinder 48 (refer to FIG. 2). The hydraulic motor and the hydraulic cylinders 44 to 48 are driven by hydraulic oil from a hydraulic pump which is not shown in the view.

The front section of the drawbar 40 is attached to the front section of the front section vehicle body 6 so as to be able to swing. The rear section of the drawbar 40 is raised and lowered up and down due to the synchronized expansion and contraction of the pair of lift cylinders 44 and 45. In addition, the drawbar 40 swings while centered on an axis along the front and back direction due to the lift cylinders 44 and 45 expanding and contracting differently. Furthermore, the drawbar 40 moves to the left and right due to the expansion and contraction of the drawbar shift cylinder 46.

The circle 41 is attached to the rear section of the drawbar 40 so as to be able to rotate. The circle 41 is driven by the hydraulic motor. Due to this, the circle 41 rotates in the clockwise direction or counterclockwise direction with regard to the drawbar 40 as seen from above the vehicle.

The blade 42 is supported so as to be able to slid portione in the left and right direction with regard to the circle 41. In addition, the blade 42 is supported to be able to swing while centered on a shaft which is parallel to the left and right direction with regard to the circle 41. The blade 42 moves left and right with regard to the circle 41 using the blade shift cylinder 47. In addition, the blade 42 swings while centered on a shaft which is parallel to the left and right direction with regard to the circle 41 using the tilt cylinder 48 (refer to FIG. 2). As described above, it is possible for the blade 42 to perform raising and lowering up and down, changing of the inclination with regard to the front and back direction, changing of the inclination with regard to the left and right direction, rotation, and shifting in the left and right direction, via the drawbar 40 and the circle 41.

Figure 3:
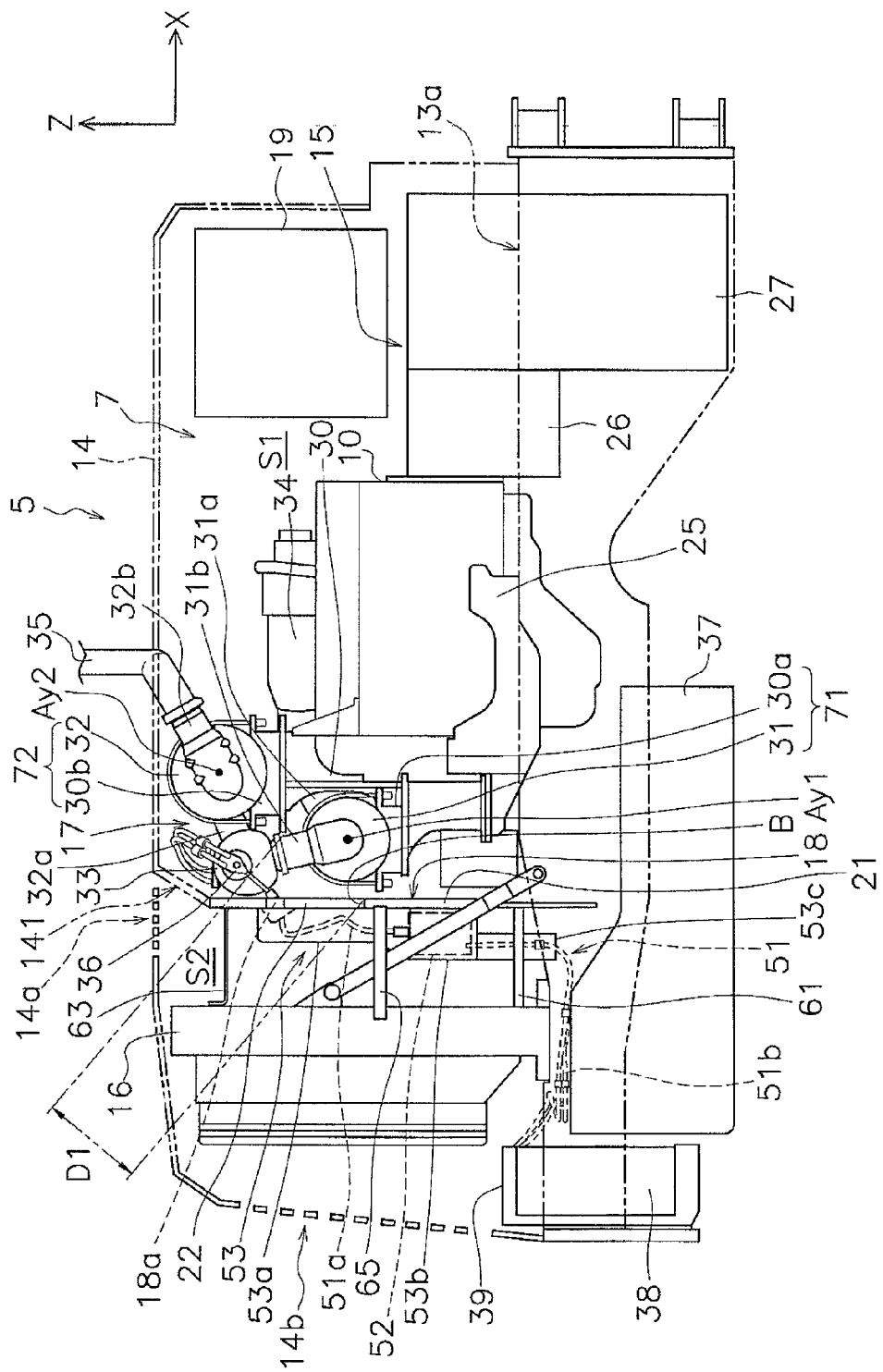
FIG. 3 is a side view of the configuration in an engine room of the work vehicle.
Figure 4:
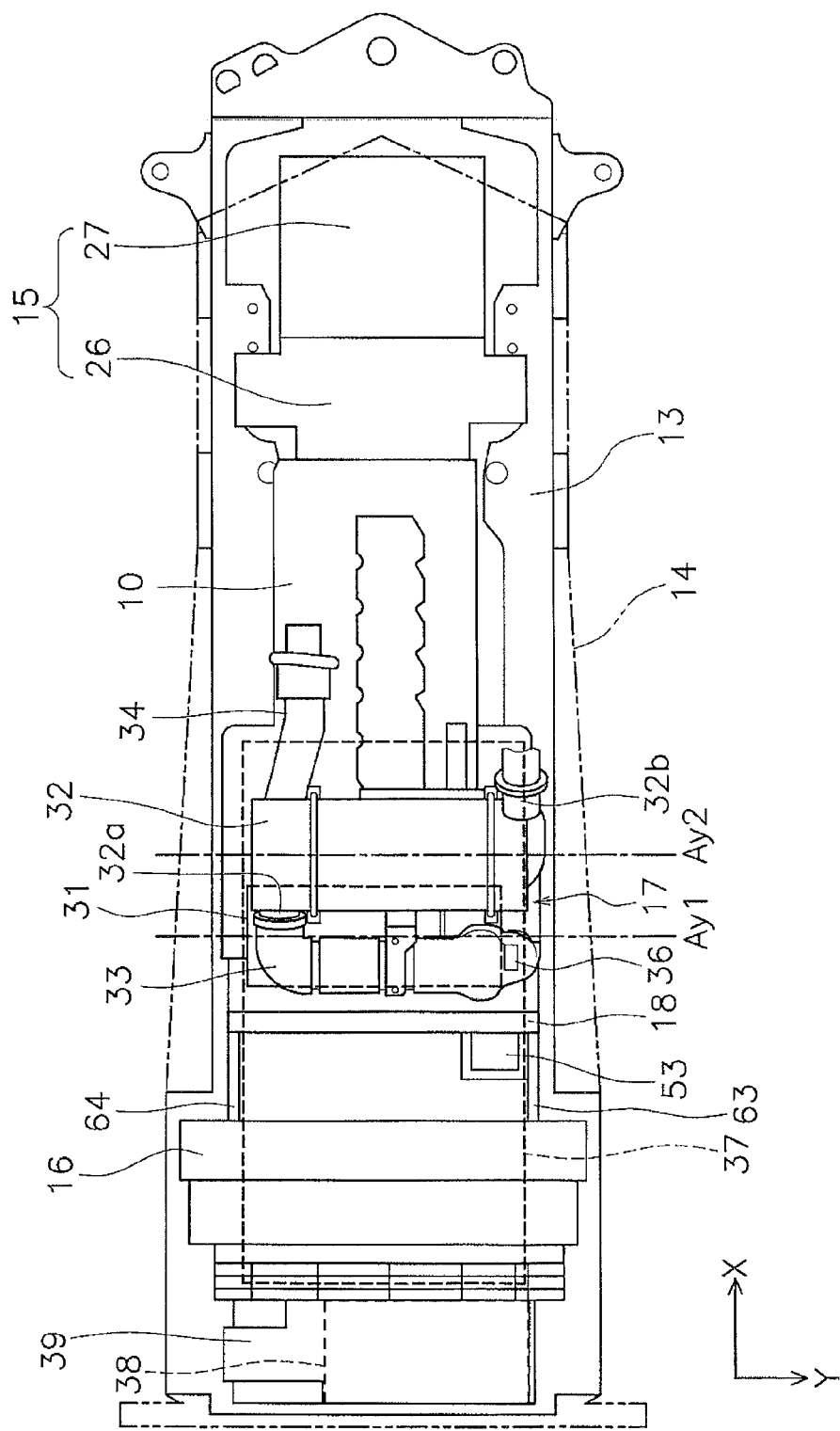
FIG. 4 is a planar view of the configuration in the engine room.

FIG. 3 is a right side view of the internal configuration of the engine room 7. FIG. 4 is a planar view of the internal configuration of the engine room 7. As shown in FIG. 3 and FIG. 4, the rear section vehicle body 5 has a vehicle body frame 13 and a vehicle body cover 14. In FIG. 3, for convenience of description, the outer shapes of the vehicle body frame 13 and the vehicle body cover 14 are shown by a two-dot chain line. In addition, in FIG. 4, for convenience of description, the outer shape of the vehicle body cover 14 is shown by a two-dot chain line. As shown in FIG. 3, the vehicle body frame 13 supports an engine 10 and a radiator 16 which will be described later. The vehicle body cover 14 is attached to the vehicle body frame 13. The vehicle body cover 14 covers the engine room 7. In detail, the vehicle body cover 14 covers the top, left, right, and rear of the engine room 7.

The engine 10, a power transmission apparatus 15, the radiator 16, an exhaust processing unit 17, a hydraulic oil tank 19, and the like are arranged in the engine room 7. The radiator 16, the exhaust processing unit 17, the engine 10, and the power transmission apparatus 15 are arranged in order from the rear of the vehicle toward the front of the vehicle. The hydraulic oil tank 19 is arranged above the power transmission apparatus 15. Here, the hydraulic oil tank 19 shown in FIG. 3 is omitted in FIG. 4 for ease of understanding.

The work vehicle 1 is provided with a partition wall 18. The partition wall 18 is arranged between the engine 10 and the radiator 16 in the front and back direction. As shown in FIG. 3, the partition wall 18 segments the inside section of the engine room 7 into a first accommodation space S1 and a second accommodation space S2. The partition wall 18 has a plate shape which extends in the up and down direction and the left and right direction. The exhaust processing unit 17, the engine 10, and the power transmission apparatus 15 are accommodated in the first accommodation space S1. The radiator 16 is accommodated in the second accommodation space S2. The configuration of the partition wall 18 will be described in detail later.

The upper surface of the vehicle body cover 14 described above is provided with an upper section opening 14a. The upper section opening 14a is arranged above the second accommodation space S2 and is linked to the second accommodation space S2. The front edge section of the upper section opening 14a is positioned forward of the partition wall 18. The vehicle body cover 14 includes an inclined surface section 141. The inclined surface section 141 is provided to span across the front edge section of the upper section opening 14a and the upper end section of the partition wall 18. The inclined surface section 141 is inclined obliquely forward and upward.

A rear section opening 14b is provided in the rear surface of the vehicle body cover 14. The rear section opening 14b is positioned behind the radiator 16. The air outside the vehicle is taken from the upper section opening 14a into the second accommodation space S2. The air passes by the radiator 16 in the second accommodation space S2 and is discharged to the outside of the vehicle from the rear section opening 14b.

The engine 10 is supported by the vehicle body frame 13 via a mounting bracket 25. The mounting bracket 25 is attached to the vehicle body frame 13.

The power transmission apparatus 15 transmits power from the engine 10. The power transmission apparatus 15 has a transmission 27 and a torque converter 26. The torque converter 26 is connected to the output side of the engine 10. The torque converter 26 transmits power from the engine 10 to the transmission 27. The transmission 27 is connected to the output side of the torque converter 26. The transmission 27 has a clutch, transmission gears, and the like which are not shown in the view. The transmission 27 transmits the power from the engine 10 to the rear wheels 12 through a final reduction gear and a tandem apparatus which are not shown in the view.

The radiator 16 cools the cooling water in the engine 10. The radiator 16 is arranged rearward of the engine 10 and the exhaust processing unit 17. The radiator 16 is supported by the vehicle body frame 13.

The exhaust processing unit 17 has an exhaust processing apparatus support bracket 30, a first exhaust processing apparatus 31, a second exhaust processing apparatus 32, and a second connecting pipe 33. In addition, the work vehicle 1 is further provided with a first connecting pipe 34 and an exhaust pipe 35. The first connecting pipe 34 is a pipe for feeding exhaust of the engine 10 into the exhaust processing unit 17. The exhaust pipe 35 is a pipe for discharging exhaust, which is processed in the exhaust processing unit 17, to the outside.

The exhaust processing apparatus support bracket 30 supports the first exhaust processing apparatus 31 and the second exhaust processing apparatus 32. The exhaust processing apparatus support bracket 30 is attached to the mounting bracket 25. The exhaust processing apparatus support bracket 30 includes a first mount section 30a and a second mount section 30b. The first mount section 30a supports the first exhaust processing apparatus 31. The second mount section 30b supports the second exhaust processing apparatus 32. The first mount section 30a and the first exhausting processing apparatus 31 configure a first exhaust processing unit 71. The second mount section 30b and the second exhausting processing apparatus 32 configure a second exhaust processing unit 72.

For example, the first exhaust processing apparatus 31 is a diesel particulate filter apparatus. The first exhaust processing apparatus 31 processes the exhaust from the engine 10 which is fed through the first connecting pipe 34. The first exhaust processing apparatus 31 captures the particulate matter which is included in the exhaust using a filter. The first exhaust processing apparatus 31 incinerates the captured particulate matter using a heater which is installed in the filter.

The first exhaust processing apparatus 31 has a substantially cylindrical outer shape. As shown in FIG. 4, the first exhaust processing apparatus 31 is arranged such that a center axis line Ay1 of the first exhaust processing apparatus 31 is along the vehicle width direction. The first exhaust processing apparatus 31 has a first connecting port 31a and a second connecting port 31b. The first connecting pipe 34 is connected to the first connecting port 31a. The second connecting pipe 33 is connected to the second connecting port 31b.

The first connecting port 31a protrudes obliquely upward. In detail, the first connecting port 31a protrudes obliquely upward and toward the engine 10 side. The bottom portion of the first exhaust processing apparatus 31 is positioned below the highest position of the engine 10. The first exhaust processing apparatus 31 is arranged at a position which does not overlap with the engine 10 in a planar view. In detail, the first exhaust processing apparatus 31 is arranged behind the engine 10. The first exhaust processing apparatus 31 is arranged between the engine 10 and the partition wall 18 in the front and back direction.

The second connecting port 31b substantially protrudes upward. However, the second connection port 31b is inclined from the up and down direction slightly toward the rear. The second connecting pipe 33 is connected to the first exhaust processing apparatus 31 and the second exhaust processing apparatus 32. As shown in FIG. 3, the outer diameter of the second connecting pipe 33 is smaller than the outer diameter of the first exhaust processing apparatus 31. One end of the second connecting pipe 33 is connected to the second connecting port 31b of the first exhaust processing apparatus 31. The other end of the second connecting pipe 33 is connected to a third connecting port 32a of the second exhaust processing apparatus 32.

The second connecting pipe 33 is arranged above the first exhaust processing apparatus 31. In addition, the second connecting pipe 33 is arranged behind the second exhaust processing apparatus 32. The top portion of the second connecting pipe 33 is positioned lower than the top portion of the second exhaust processing apparatus 32. A reducing agent injection apparatus 36 is attached to the second connecting pipe 33. The reducing agent injection apparatus 36 injects the reducing agent inside the second connecting pipe 33.

The second exhaust processing apparatus 32 is a selective catalytic reduction apparatus. The second exhaust processing apparatus 32 processes the exhaust from the engine 10 which is processed by the first exhaust processing apparatus 31. The second exhaust processing apparatus 32 selectively reduces the nitrogen oxide (NOx) using the reducing agent. For example, aqueous urea or the like is used as the reducing agent.

The second exhaust processing apparatus 32 has a substantially cylindrical outer shape. As shown in FIG. 4, the second exhaust processing apparatus 32 is arranged such that a center axis line Ay2 of the second exhaust processing apparatus 32 is along the vehicle width direction. In addition, the second exhaust processing apparatus 32 is arranged such that the center axis line Ay2 is parallel to the center axis line Ay1 of the first exhaust processing apparatus 31. The second exhaust processing apparatus 32 is arranged higher than the first exhaust processing apparatus 31. In detail, the bottom portion of the second exhaust processing apparatus 32 is arranged higher than the top portion of the first exhaust processing apparatus 31. The second exhaust processing apparatus 32 is arranged to overlap with a portion of the first exhaust processing apparatus 31 in a planar view. In addition, the second exhaust processing apparatus 32 is arranged so as to overlap with a portion of the engine 10 in a planar view.

The second connecting pipe 33 and the reducing agent injection apparatus 36 are arranged between the second exhaust processing apparatus 32 and the partition wall 18. A gap between the second exhaust processing apparatus 32 and the partition wall 18 is smaller than the outer shape of the first exhaust processing apparatus 31. The second connecting pipe 33 is arranged above the first exhaust processing apparatus 31. The second connecting pipe 33 is arranged below the inclined surface section 141 described above. The second connecting pipe 33 and the reducing agent injection apparatus 36 are arranged between the engine 10 and a reducing agent tank 38 which will be described later in the front and back direction.

The second exhaust processing apparatus 32 has the third connecting port 32a and a fourth connecting port 32b. The second connecting pipe 33 is connected to the third connecting port 32a. The exhaust pipe 35 is connected to the fourth connecting port 32b. The third connecting port 32a is inclined downward from the horizontal direction toward the rear.

The fourth connecting port 32b protrudes obliquely upward. In detail, the fourth connecting port 32b protrudes obliquely upward and toward the engine 10 side. Due to this, the exhaust pipe 35 protrudes obliquely upward above the engine 10. The upper section of the exhaust pipe 35 protrudes upward from the vehicle body cover 14.

The engine 10, the first connecting pipe 34, the first exhaust processing apparatus 31, the second connecting pipe 33, the second exhaust processing apparatus 32, and the exhaust pipe 35 are connected in series in this order. Accordingly, the exhaust from the engine 10 passes through the first connecting pipe 34 and is fed into the first exhaust processing apparatus 31. In the first exhaust processing apparatus 31, particulate matter in the exhaust is mostly reduced from in the exhaust. Next, the exhaust passes through the second connecting pipe 33 and is fed into the second exhaust processing apparatus 32. In the second exhaust processing apparatus 32, the NOx is mostly reduced. Thereafter, the cleaned exhaust passes through the exhaust pipe 35 and is discharged to the outside.

A fuel tank 37 for retaining fuel and the reducing agent tank 38 for retaining the reducing agent are arranged below the engine room 7. The fuel tank 37 and the reducing agent tank 38 are arranged to protrude below the vehicle body frame 13. The fuel tank 37 is arranged so as to at least partially overlap with the engine 10 in a planar view. The fuel tank 37 is arranged below the partition wall 18. The fuel tank 37 is arranged between the transmission 27 and the reducing agent tank 38 in the front and back direction. That is, the transmission 27 is arranged in front of the fuel tank 37.

The reducing agent tank 38 is arranged behind the fuel tank 37. The reducing agent tank 38 is arranged rearward of the partition wall 18. The reducing agent tank 38 is arranged rearward of the radiator 16.

As shown in FIG. 3, the reducing agent tank 38 and reduction agent injection apparatus 36 are connected using a reducing agent hose 51. The reducing agent hose 51 is arranged so as to pass from the reducing agent tank 38, below the radiator 16, and extend to the front. The reducing agent hose 51 bends upward between the radiator 16 and the partition wall 18 and is arranged so as to extend in the up and down direction along the partition wall 18. The partition wall 18 has a through hole 18a, and the upper section of the reducing agent hose 51 passes through the through hole 18a and is connected to the reducing agent injection apparatus 36 in the first accommodation space S1.

In detail, the reducing agent hose 51 has a first hose portion 51a and a second hose portion 51b. The first hose portion 51a is arranged between a position below a third cover member 53c (below the partition wall 18) and the reducing agent injection apparatus 36. The first hose portion 51a is arranged along the partition wall 18 in the second accommodation space S2. The first hose portion 51a is arranged to extend in the up and down direction along the partition wall 18 in the second accommodation space S2. A reducing agent pump 52 is connected in the middle of the first hose portion 51a. The reducing agent pump 52 is attached to the partition wall 18 in the second accommodation space S2.

The second hose portion 51b is arranged between the reducing agent tank 38 and a position below the third cover member 53c (below the partition wall 18). The second hose portion 51b is arranged so as to pass below the radiator 16. The second hose portion 51b is arranged so as to pass above the fuel tank 37. That is, the second hose portion 51b is arranged so as to pass between the radiator 16 and the fuel tank 37.

Here, the through hole 18a in the partition wall 18 described above is positioned higher than the center position of the partition wall 18 in the up and down direction. In addition, the distance in the up and down direction between the through hole 18a and the reducing agent injection apparatus 36 is smaller than the distance in the up and down direction between the through hole 18a and the lower end portion of the radiator 16. Accordingly, a portion of the first house portion 51a, which is positioned in the first accommodating space S1, is shorter than a portion of the first hose portion 51a, which is positioned in the second accommodating space S2. As a result, a portion of the reducing agent hose 51, which is exposed to a high temperature environment in the first accommodating space S1, is shorter.

Figure 5:
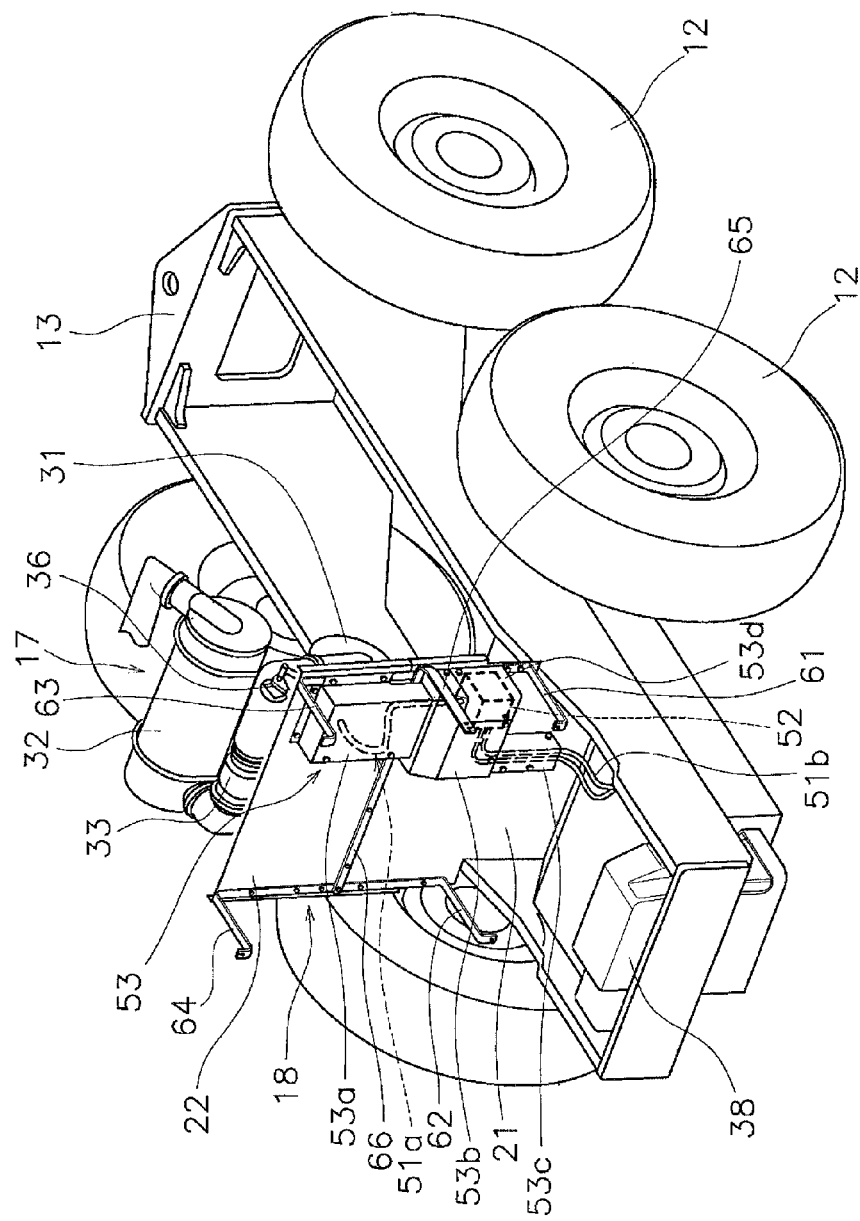
FIG. 5 is a perspective view of the configuration in the engine room.

FIG. 5 is a perspective view illustrating a portion of the configuration of the engine room 7. As shown in FIG. 3 and FIG. 5, the work vehicle 1 has a cover member 53. The cover member 53 covers at least a portion of the reducing agent hose 51 in the second accommodation space S2. In detail, the cover member 53 covers the first hose portion 51a and the reducing agent pump 52. In addition, the cover member 53 covers the through hole 18a in the partition wall 18 described above. The cover member 53 is attached to the partition wall 18.

In detail, the cover member 53 has a first cover member 53a, a second cover member 53b, and the third cover member 53c. The first cover member 53a covers the through hole 18a in the partition wall 18 and the upper section of the first hose portion 51a. The upper section of the first hose portion 51a is a portion, which is positioned higher than the reducing agent pump 52, in the first hose portion 51a.

The second cover member 53b is arranged below the first cover member 53a. The second cover member 53b is separate from the first cover member 53a. The second cover member 53b covers the reducing agent pump 52. The second cover member 53b has a lid portion 53d. The lid portion 53d is attached with regard to the other portions of the second cover member 53b so as to be able to be attached and detached. Due to this, access to the reducing agent pump 52 is easy and the maintenance of the reducing agent pump 52 is easy.

The third cover member 53c is arranged below the second cover member 53b. The third cover member 53c covers the lower section of the first hose portion 51a. The lower section of the first hose portion 51a is a portion, which is positioned lower than the reducing agent pump 52, in the first hose portion 51a. The third cover member 53c extends up to a position below the upper edge section of the vehicle body frame 13. In detail, the lower end portion of the third cover member 53c is positioned lower than the upper edge of the vehicle body frame 13. The lower end portion of the third cover member 53c is positioned lower than the lower end portion of the radiator 16.

Figure 6:
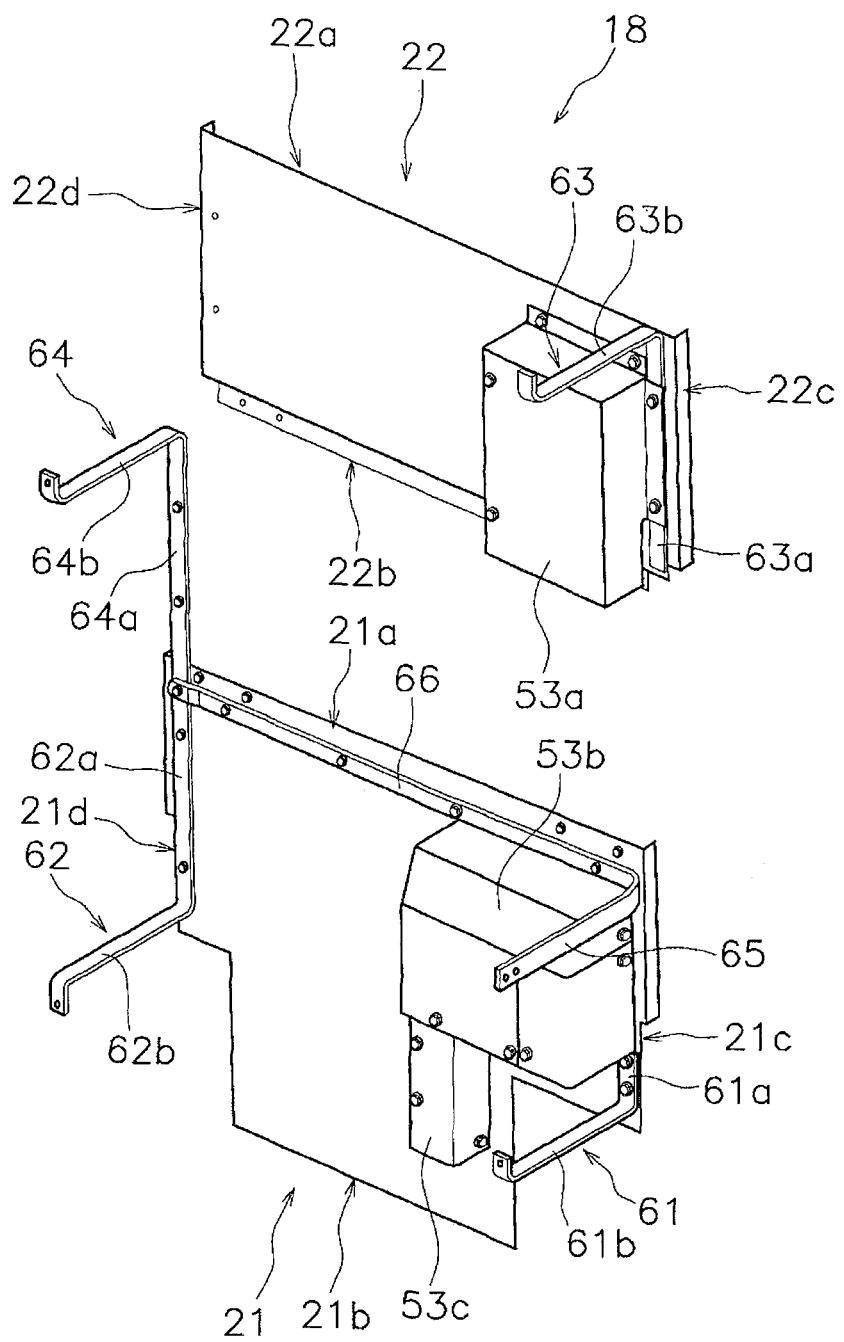
FIG. 6 is an exploded perspective view illustrating a configuration of a partition wall.

Next, the configuration of the partition wall 18 will be described. FIG. 6 is an exploded perspective view illustrating the configuration of the partition wall 18. As shown in FIG. 6, the partition wall 18 has a first wall member 21 and a second wall member 22. The second wall member 22 is separate from the first wall member 21. The second wall member 22 is arranged above the first wall member 21. The second wall member 22 is provided to be able to be attached to and detached from the first wall member 21.

The first wall member 21 has a first upper edge section 21a, a first lower edge section 21b, a first lower side edge section 21c, and a second lower side edge section 21d. The first upper edge section 21a has a substantially linear shape. The first upper edge section 21a is arranged along the vehicle width direction. The first lower edge section 21b has a substantially linear shape. The first lower edge section 21b is arranged along the vehicle width direction. The length of the first lower edge section 21b in the vehicle width direction is shorter than the length of the first upper edge section 21a in the vehicle width direction such that it is possible for the first lower edge section 21b to be inserted into the width of the vehicle body frame 13 (refer to FIG. 5).

The first lower side edge section 21c is one of the side edge sections of the first wall member 21 in the vehicle width direction. The second lower side edge section 21d is the other side edge section of the first wall member 21 in the vehicle width direction. In the present embodiment, the first lower side edge section 21c is the right side edge section of the first wall member 21. The second lower side edge section 21d is the left side edge section of the first wall member 21. The first lower side edge section 21c is arranged along the up and down direction. The first lower side edge section 21c has a substantially linear shape. The second lower side edge section 21d is arranged along the up and down direction. The second lower side edge section 21d has a substantially linear shape.

The second wall member 22 has a second upper edge section 22a, a second lower edge section 22b, a first upper side edge section 22c, and a second upper side edge section 22d. The second upper edge section 22a has a substantially linear shape. The second upper edge section 22a is arranged along the vehicle width direction. The second lower edge section 22b is linked to the first upper edge section 21a of the first wall member 21. For example, the second lower edge section 22b is linked to the first upper edge section 21a of the first wall member 21 using a fixing means such as a bolt. The second lower edge section 22b has a substantially linear shape. The second lower edge section 22b is arranged along the vehicle width direction.

The first upper side edge section 22c is one of the side edge sections of the second wall member 22 in the vehicle width direction. The second upper side edge section 22d is the other side edge section of the second wall member 22 in the vehicle width direction. In the present embodiment, the first upper side edge section 22c is the right side edge section of the second wall member 22. The second upper side edge section 22d is the left side edge section of the second wall member 22. The first upper side edge section 22c is arranged along the up and down direction. The first upper side edge section 22c has a substantially linear shape. The second upper side edge section 22d is arranged along the up and down direction. The second upper side edge section 22d has a substantially linear shape. The first lower side edge section 21c and the second lower side edge section 21d of the first wall member 21 and the first upper side edge section 22c and the second upper side edge section 22d of the second wall member 22 are bent at a right angle to the front side of the partition wall 18 with regard to the width direction. This is for attaching a seal member for eliminating a gap between the outer cover and the partition wall 18. In addition, it is possible to achieve strengthening of the partition wall 18 using this configuration.

The partition wall 18 is supported by the radiator 16 via a plurality of support members 61 to 65. As shown in FIG. 6, the work vehicle 1 is provided with a first lower support member 61, a second lower support member 62, a first upper support member 63, and a second upper support member 64. The first lower support member 61 supports one of the edge sections of the first wall member 21 in the vehicle width direction. The second lower support member 62 supports the other edge section of the first wall member 21 in the vehicle width direction. In the present embodiment, the first lower support member 61 supports the right edge section of the first wall member 21. The second lower support member 62 supports the left edge section of the first wall member 21.

The first lower support member 61 has a shape which is bent in the shape of the letter L. The first lower support member 61 has a vertical section 61a and a horizontal section 61b. The vertical section 61a is arranged along the first lower side edge section 21c. The vertical section 61a is attached to the first wall member 21. The vertical section 61a is arranged below the second cover member 53b. The horizontal section 61b extends from the lower edge portion of the vertical section 61a in the horizontal direction. In the present embodiment, the horizontal section 61b extends from the lower edge portion of the vertical section 61a to the rear. The front edge of the horizontal section 61b is attached to the radiator 16.

The second lower support member 62 has a shape which is bent in the shape of the letter L. The second lower support member 62 has a vertical section 62a and a horizontal section 62b. The vertical section 62a is arranged along the second lower side edge section 21d. The vertical section 62a is attached to the first wall member 21. The horizontal section 62b extends from the lower edge portion of the vertical section 62a in the horizontal direction. In the present embodiment, the horizontal section 62b extends from the lower edge portion of the vertical section 62a to the rear. The front edge of the horizontal section 62b is attached to the radiator 16.

The first upper support member 63 supports one of the edge sections of the second wall member 22 in the vehicle width direction. The second upper support member 64 supports the other edge section of the second wall member 22 in the vehicle width direction. In the present embodiment, the first upper support member 63 supports the right edge section of the second wall member 22. The second upper support member 64 supports the left edge section of the second wall member 22.

The first upper support member 63 is separate from the first lower support member 61. The first upper support member 63 is arranged above the first lower support member 61. The first upper support member 63 and the first lower support member 61 are arranged to be separated from each other in the up and down direction. The first upper support member 63 has a shape which is bent in the shape of the letter L. The first upper support member 63 has a vertical section 63a and a horizontal section 63b. The vertical section 63a is arranged along the first upper side edge section 22c. The vertical section 63a is attached to the second wall member 22. The vertical section 63a is attached to the second wall member 22 along with the first cover member 53a. The horizontal section 63b extends from the upper edge portion of the vertical section 63a in the horizontal direction. In the present embodiment, the horizontal section 63b extends from the upper edge portion of the vertical section 63a to the rear. The tip edge of the horizontal section 63b is attached to the radiator 16.

The second upper support member 64 is arranged above the second lower support member 62. The second upper support member 64 has a shape which is bent in the shape of the letter L. The second upper support member 64 has a vertical section 64a and a horizontal section 64b. The vertical section 64a is arranged along the second upper side edge section 22d in a state where the second wall member 22 is attached to the first wall member 21. The vertical section 64a is attached to the first wall section 21 in a state where the second wall member 22 is attached to the first wall member 21. The vertical section 64a of the second upper support member 64 is integrally formed with the vertical section 62a of the second lower support member 62. That is, the second lower support member 62 and the second upper support member 64 are integrally formed. The horizontal section 64b extends from the upper edge portion of the vertical section 64a in the horizontal direction. In the present embodiment, the horizontal section 64b extends from the upper edge portion of the vertical section 64a to the rear. The tip edge of the horizontal section 64b is attached to the radiator 16.

The work vehicle 1 is provided with an intermediate support member 65 and a connecting member 66. The intermediate support member 65 supports one of the edge sections of the first wall member 21 in the vehicle width direction. In the present embodiment, the intermediate support member 65 supports the right edge section of the first wall member 21. The intermediate support member 65 is arranged between the first upper support member 63 and the first lower support member 61 in the up and down direction. The intermediate support member 65 is attached to the first wall member 21 above the first lower support member 61. The intermediate support member 65 supports the load of the reducing agent pump 52 which is generated due to the first upper support member 63 and the first lower support member 61 being separate.

The connecting member 66 is attached to the first wall member 21. The connecting member 66 is arranged along the first upper edge section 21a. The connecting member 66 connects the intermediate support member 65 and the vertical section 62a of the second lower support member 62. The connecting member 66 is integrally formed with the intermediate support member 65.

The first cover member 53a described above is attached to the second wall member 22. The reducing agent pump 52 is attached to the first wall member 21. The second cover member 53b and the third cover member 53c are attached to a bracket (which is not shown in the views) which is attached to the first wall member 21. The second cover member 53b is positioned between the first lower support member 61 and the first upper support member 63 in the up and down direction. The second cover member 53b is positioned between the first lower support member 61 and the intermediate support member 65 in the up and down direction. The second cover member 53b is arranged to be close to the first lower side edge section 21c.

As shown in FIG. 3, a boundary B between the first wall member 21 and the second wall member 22 is positioned lower than the top portion of the first exhaust processing apparatus 31. The boundary B is positioned higher than the bottom portion of the first exhaust processing apparatus 31. In detail, the boundary B is positioned between the center axis line Ay1 of the first exhaust processing apparatus 31 and the bottom portion of the first exhaust processing apparatus 31 in the up and down direction.

The distance between the boundary B and the second exhaust processing unit 72 is larger than the outer diameter of the first exhaust processing apparatus 31. In detail, as shown in FIG. 3, a distance D1 between the boundary B and second mount section 30b is larger than the outer diameter of the first exhaust processing apparatus 31.

Figure 7:
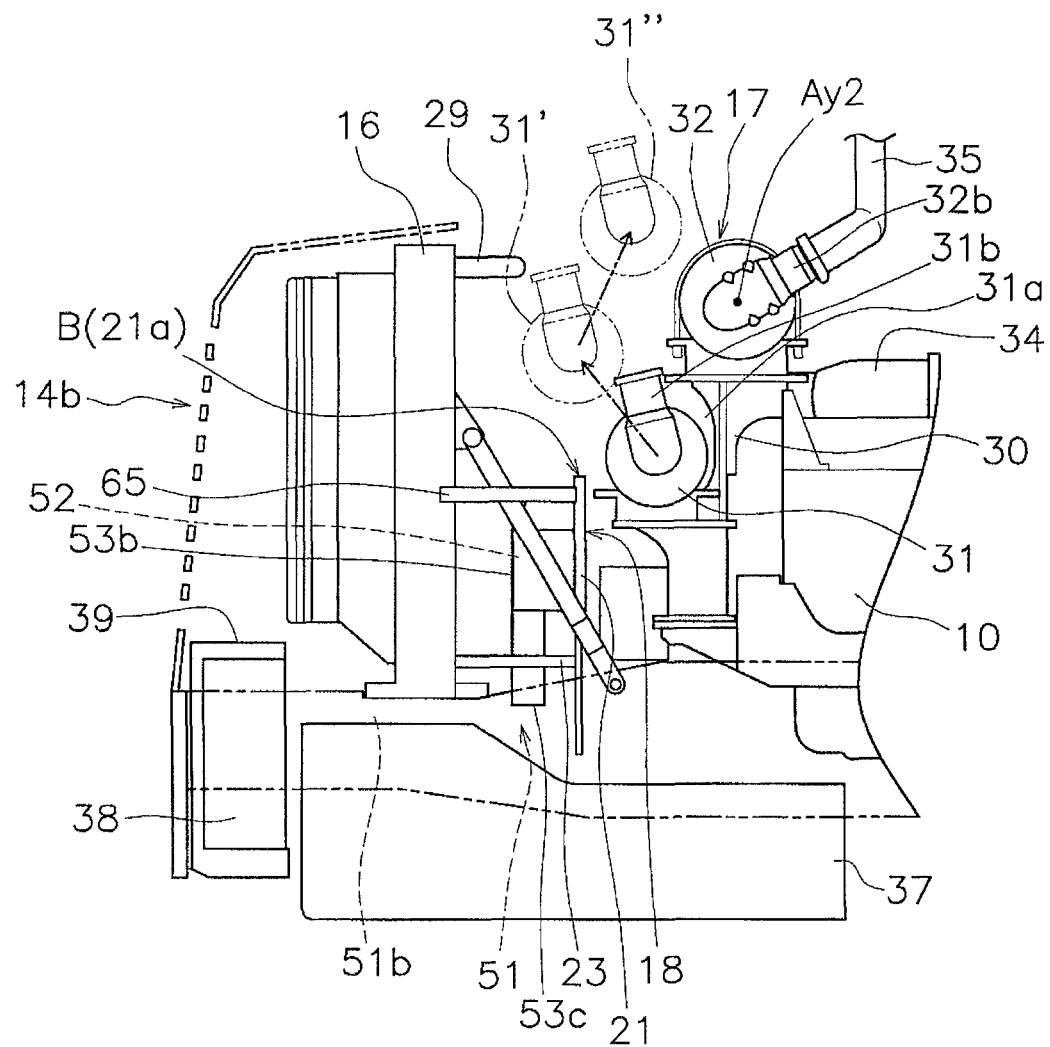
FIG. 7 is a side view illustrating a portion of a configuration in the engine room in a state where a second wall member has been removed.

FIG. 7 is a side view illustrating a portion of the configuration in the engine room 7 in a state where the second wall member 22 has been removed. As shown in FIG. 7, it is possible to secure a space behind the first exhaust processing apparatus 31 for moving the first exhaust processing apparatus 31 upward due to the second wall member 22 being removed from the vehicle. Due to this, it is possible to easily remove the first exhaust processing apparatus 31 from the vehicle. The sequence for removing the first exhaust processing apparatus 31 is as follows.

The reducing agent hose 51 is removed from the reducing agent injection apparatus 36 and the second connecting pipe 33 is removed from the first exhaust processing apparatus 31 and the second exhaust processing apparatus 32. Next, the reducing agent hose which has been removed from the reducing agent injection apparatus 36 is passed through the through hole 18a in the partition wall 18 and is returned to the second accommodating space S2 side. After this, the second wall member 22 is removed from the first wall member 21. The link between the first wall member 21 and the second wall member 22 is released when the second wall member 22 is removed from the first wall member 21. In detail, a fixing means such as a bolt, which links the second lower edge section 22b of the second wall member 22 and the first upper edge section 21a of the first wall member 21, is removed. In addition, the link between the second upper support member 64 and the second wall member 22 is released. In detail, a fixing means such as a bolt, which links the vertical section 64a of the second upper support member 64 and the second wall member 22, is removed. Then, the second wall member 22 is removed from the first wall member 21.

Next, fixing of the first exhaust processing apparatus 31 to the exhaust processing apparatus support bracket 30 is released. Then, the first exhaust processing apparatus 31 is moved obliquely upward to the rear so as to pass above the first wall member 21 (refer to 31' in FIG. 7). After this, the first exhaust processing apparatus 31 passes between the radiator 16 and the second exhaust processing apparatus 32 and is moved upward (refer to 32" in FIG. 7). Due to this, the first exhaust processing apparatus 31 is removed from the vehicle.

Here, the upper surface of the vehicle body cover 14 (refer to FIG. 3) is provided to be able to be attached and detached, and the upper surface of the vehicle body cover 14 is removed from the vehicle when the first exhaust processing apparatus 31 is removed from the vehicle. In addition, as shown by 31" in FIG. 7, the first exhaust processing apparatus 31 is moved obliquely upward to the front, but this is to avoid a pipe 29 which is connected to the radiator 16. Accordingly, in a case were the pipe 29 is not provided or the pipe 29 does not interfere with the movement of the first exhaust processing apparatus 31, the first exhaust processing apparatus 31 is moved straight up from the position which is indicated by the reference numeral 31'.

As above, in the work vehicle 1 according to the present embodiment, it is possible to easily remove the first exhaust processing apparatus 31 from the vehicle by removing the second wall member 22 even when the partition wall 18 is arranged to be close to the first exhaust processing apparatus 31 and the second exhaust processing apparatus 32. Due to this, it is possible to easy carry out maintenance on the exhaust processing apparatuses while the devices inside the engine room 7 are arranged in a compact manner.

The boundary B is positioned higher than the bottom portion of the first exhaust processing apparatus 31. As a result, it is possible to reduce the size of the second wall member 22 compared to a case where the boundary B is positioned lower than the bottom portion of the first exhaust processing apparatus 31. Due to this, it is possible to easily remove the second wall member 22 from the vehicle.

The boundary B is positioned between the center axis line Ay1 of the first exhaust processing apparatus 31 and the bottom portion of the first exhaust processing apparatus 31 in the up and down direction. As a result, it is possible to secure a large space behind the first exhaust processing apparatus 31 for moving the first exhaust processing apparatus 31.

A gap between the second exhaust processing apparatus 32 and the partition wall 18 is smaller than the outer shape of the first exhaust processing apparatus 32. As a result, it is possible to arrange the second exhaust processing apparatus 32 and the partition wall 18 in a compact manner.

The second connecting pipe 33 is arranged between the second exhaust processing apparatus 32 and the partition wall 18 and arranged above the first exhaust processing apparatus 31. In this case, it is possible to easily remove the second connecting pipe 33.

The first cover member 53a is attached to the second wall member 22. As a result, it is possible for the first cover member 53a to be removed along with the second wall member 22 without removing the first cover member 53a from the second wall member 22 when removing the second wall member 22. Due to this, it is possible to reduce the effort required to remove the first cover member 53a from the second wall member 22 when removing the second wall member 22.

The second wall member 22 is supported by the radiator 16. In addition, the radiator 16 is supported by the vehicle body frame 13. Accordingly, it is possible for the second wall member 22 to be supported by the vehicle body frame 13 using a simple configuration.

Above, one embodiment is described but the present invention is not limited to the embodiment described above and various modifications are possible within the scope which does not depart from the scope of the invention.

The work vehicle is not limited to a motor grader and may be other types of work vehicles such as a hydraulic excavator, a bulldozer, or a wheel loader.

The configuration of the exhaust processing unit 17 is not limited to the configuration described above. For example, the first exhaust processing apparatus 31 may be an apparatus which is different to a diesel particulate filter apparatus. The second exhaust processing apparatus 32 may be an apparatus which is different to a selective catalytic reduction apparatus. Alternatively, the second exhaust processing apparatus 32 may be a selective catalytic reduction apparatus which uses a reducing agent other than aqueous urea.

The positions of the engine 10, the radiator 16, the partition wall 18, the first exhaust processing apparatus 31, and the second exhaust processing apparatus 32 are not limited to the positions described above. The engine 10, the radiator 16, the partition wall 18, the first exhaust processing apparatus 31, and the second exhaust processing apparatus 32 may be arranged to be aligned in the vehicle width direction.

The second connecting pipe 33 may be arranged in a different position without being limited to being between the second exhaust processing apparatus 32 and the partition wall 18. For example, the second connecting pipe 33 may be arranged between the first exhaust processing apparatus 31 and the engine 10 and arranged below the second exhaust processing apparatus 32. In this case, it is possible to suppress the second connecting pipe 33 from becoming an obstacle when removing the first exhaust processing apparatus 31 from the vehicle.

The boundary B between the first wall member 21 and the second wall member 22 may be positioned at the same height as the top portion of the first exhaust processing apparatus 31. Alternatively, the boundary B may be positioned at the same height as the bottom portion of the first exhaust processing apparatus 31. Alternatively, the boundary B may be positioned lower than the bottom portion of the first exhaust processing apparatus 31.

It is preferable that the distance between the boundary B and the second exhaust processing apparatus 32 be larger than the outer diameter of the first exhaust processing apparatus when the distance between the boundary B and the second exhaust processing apparatus 32 is smaller than the distance D1 between the boundary B and the second mount section 30b. That is, it is preferable that the distance between the boundary B and the second exhaust processing apparatus 32 be larger than the outer diameter of the first exhaust processing apparatus 31 in a case where the second exhaust processing apparatus 32 is arranged closer to the boundary B than the second mount section 30b.

The first lower support member 61, the second lower support member 62, the first upper support member 63, and the second upper support member 64 may be attached to a component other than the radiator 16. For example, the first lower support member 61, the second lower support member 62, the first upper support member 63, and the second upper support member 64 may be attached to the vehicle body frame 13.

The reducing agent pump 52 may be attached to the second wall member 22. However, from the point of view of easily removing the second wall member 22, it is preferable that the reducing agent pump 52 be attached to the first wall member 21 as in the embodiment described above.

The first lower support member 61 and the first upper support member 63 may be integrally formed. The second lower support member 62 and the second upper support member 64 may be separate.

According to the illustrated embodiment, it is possible to provide a work vehicle where it is possible to easy carry out maintenance on the exhaust processing apparatuses while the devices inside the engine room are arranged in a compact manner.

The invention claimed is:

1. A work vehicle comprising:
an engine room;
an engine arranged in the engine room;
a radiator arranged in the engine room;
a partition wall arranged between the engine and the radiator in the engine room, the partition wall being arranged to segment between a first accommodating space in which the engine is arranged and a second accommodating space in which the radiator is arranged;
a first exhaust processing unit having a first exhaust processing apparatus arranged between the engine and the partition wall, and a first mount section supporting the first exhaust processing apparatus; and
a second exhaust processing unit having a second exhaust processing apparatus arranged above the first exhaust processing apparatus, and a second mount section supporting the second exhaust processing apparatus,
wherein the second exhaust processing apparatus is arranged to overlap with at least a portion of the first exhaust processing apparatus in a planar view of the work vehicle,
the partition wall has a first wall member and a second wall member separate from the first wall member,
the second wall member is arranged above the first wall member, and
a distance between a boundary between the first wall member and the second wall member and the second exhaust processing unit is larger than an outer diameter of the first exhaust processing apparatus.

2. The work vehicle according to claim 1, wherein
a distance between the boundary and the second mount section is larger than the outer diameter of the first exhaust processing apparatus.

3. The work vehicle according to claim 1, wherein
the distance between the boundary and the second exhaust processing apparatus is larger than the outer diameter of the first exhaust processing apparatus.

4. The work vehicle according to claim 1, wherein
the boundary is positioned to be the same height as or to be lower than a top portion of the first exhaust processing apparatus.

5. The work vehicle according to claim 4, wherein
the boundary is positioned to be the same height as or to be higher than a bottom portion of the first exhaust processing apparatus.

6. The work vehicle according to claim 5, wherein
the boundary is positioned between a center and the bottom portion of the first exhaust processing apparatus in an up and down direction of the work vehicle.

7. The work vehicle according to claim 1, wherein
a gap between the second exhaust processing apparatus and the partition wall is smaller than an outer shape of the first exhaust processing apparatus.

8. The work vehicle according to claim 1, further comprising
a connecting pipe connecting the first exhaust processing apparatus and the second exhaust processing apparatus,
wherein the connecting pipe is arranged between the second exhaust processing apparatus and the partition wall and arranged above the first exhaust processing apparatus.

9. The work vehicle according to claim 1, further comprising
a connecting pipe connecting the first exhaust processing apparatus and the second exhaust processing apparatus,
wherein the connecting pipe is arranged between the first exhaust processing apparatus and the engine and arranged below the second exhaust processing apparatus.

10. The work vehicle according to claim 1, further comprising:
a reducing agent hose configured to supply reducing agent to the second exhaust processing apparatus; and
a cover member covering the reducing agent hose,
wherein the cover member is attached to the second wall member.

11. The work vehicle according to claim 1, further comprising
a vehicle body frame supporting the radiator,
wherein the second wall member is supported by the radiator.

12. The work vehicle according to claim 1, wherein
the first exhaust processing apparatus is a diesel particulate filter apparatus.

13. The work vehicle according to claim 1, wherein
the second exhaust processing apparatus is a selective catalytic reduction apparatus.

* * * * *